UNITED STATES PATENT OFFICE.

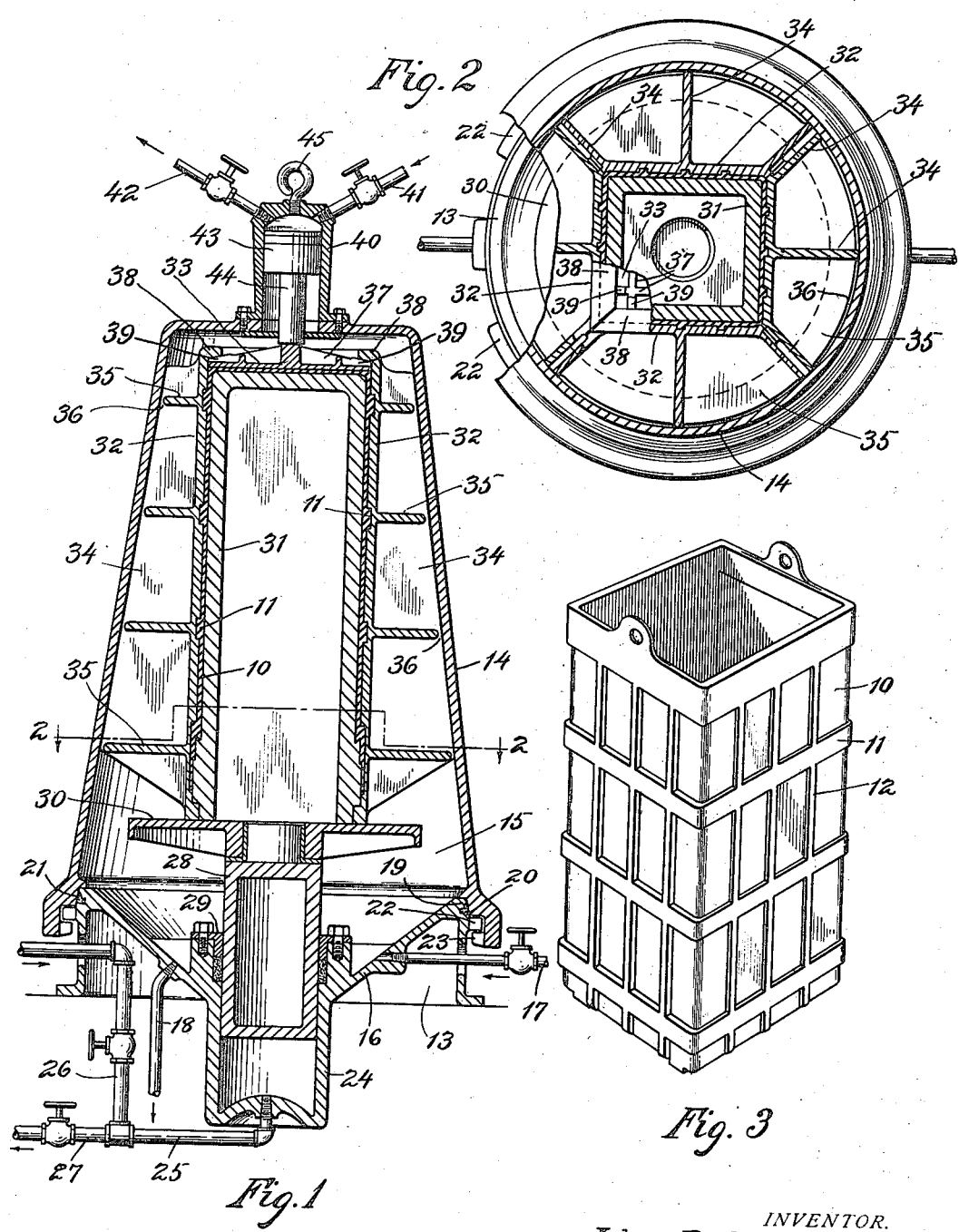

JOHN R. GAMMETER, OF AKRON, OHIO, ASSIGNOR TO THE B. F. GOODRICH COMPANY, OF NEW YORK, N. Y., A CORPORATION OF NEW YORK.

VULCANIZING-PRESS FOR BATTERY-JARS.

1,306,001.  Specification of Letters Patent.  Patented June 10, 1919.

Application filed April 18, 1917. Serial No. 163,044.

*To all whom it may concern:*

Be it known that I, JOHN R. GAMMETER, a citizen of the United States, residing at Akron, in the county of Summit and State of Ohio, have invented certain new and useful Improvements in Vulcanizing-Presses for Battery-Jars, of which the following is a specification.

This invention relates generally to the art of making rubber molded goods, and specifically to the manufacture of rubber receptacles of the nature of storage-battery jars. Its objects are, first, to provide an improved form of press whose construction is such that the forming or molding pressure may be exerted simultaneously from several directions, and especially from different lateral directions, upon several faces of the article by the use of a power device such as a cylinder and piston acting longitudinally; and secondly, to combine the improved press and an improved vulcanizer in one structure so that the forming and curing operations may both take place in the same machine or apparatus.

Of the accompanying drawings,

Figure 1 is a vertical sectional view of a vulcanizing press embodying my invention.

Fig. 2 is a horizontal section on the line 2—2 of Fig. 1, partly broken away.

Fig. 3 is a perspective view of one of the battery jars produced by the machine.

Storage-battery jars are composed of hard rubber and heretofore have usually been put together on a mandrel in the raw state by hand, and vulcanized without mechanical molding pressure. It has been found that large jars, such as those for submarine batteries, are improved by vulcanizing them in molds. In the drawings, Fig. 3 shows a jar 10 of a large type having strengthening ribs 11, 12 molded on the outside, but my invention may also be used for producing smooth-surfaced jars of large or small size, or producing any other molded rubber goods for which it or any portion of it may be found adapted. The vulcanizing press includes a base member 13 and a removable cover member 14 which between them inclose an open steam vulcanizing chamber 15. This chamber has a conical floor 16 formed on the base and is provided with suitable steam supply and waste pipes 17, 18. The base and the bell-shaped cover are formed with complemental, interfitting, conical joint-forming members 19, 20 packed by a laterally-acting soft-rubber ring 21 having an up-turned lip as shown, and they are further provided with a familiar form of locking device positioned by a relative axial movement and operated by a relative rotary movement of the parts, said device consisting of circumferentially-spaced lugs 22, 23 projecting outwardly from the rim of the base member 15 and inwardly from that of the cover member 14. Lugs 22, 23 being in their interlocking or alined positions, the joint-forming members 19, 20 and the packing ring 21 permit a limited endwise play of the cover member 14, to take up the lost motion when upward pressure is exerted in the vulcanizing chamber, without causing leakage.

The base member is formed with a hydraulic cylinder 24 having a pipe 25 connected with suitable supply and waste pipes 26, 27. 28 is a ram or piston working through a stuffing-box 29 in the upper end of the cylinder and carrying a press platen 30 at its upper end which operates from and above the level of the upper edge of the base member 13. The vulcanizing chamber 15 is formed mainly within the bell-shaped cover member 14, and any article or articles which it may be desired to subject to pressure and vulcanization in an apparatus having the general features thus far described are contained mainly or wholly within said cover member, so that the mold or molds for these articles are exposed and accessible both from the sides and the top when the cover member is removed. This permits the press to be readily loaded and unloaded without requiring an excessive travel of the press piston or the use of a deep cylinder extending for a long distance below the floor of the room in which the press is used.

31 is a former or mandrel having the size and shape of the interior of the jar to be molded, said mandrel being supported in an inverted position upon the platen 30. Also supported on said platen are the side plates 32 of a sectional outer mold which coöperates with the mandrel 31 in forming the battery jar, there being four of these plates suitably recessed on their inner faces to form the reinforcements 11, 12 on the jar. 33 is a top mold plate coöperating with the end of the mandrel for forming the bottom wall of the jar. The backs of the side plates are provided with integral, radial, vertical, stiffening ribs 34 whose outer edges converge upwardly in wedge formation and are adapted to slide against the conical inner surface of the cover 14. The backs of the plates are also formed with horizontal stiffening ribs or webs 35 which terminate short of the outer edges of the vertical ribs so as to leave spaces 36 for the circulation of steam.

The upper plate 33 is stiffened with back ribs 37, and two of its opposite edges are overlapped by flanges 38 formed on the upper edges of two of the plates 32, the said back ribs and flanges being complementally wedge-formed as indicated at 39 so that the inward motion of the side plates forces the top plate down toward the mandrel.

40 is a fluid-pressure cylinder having valved supply and discharge pipes 41 and 42 and containing a piston 43 whose stem 44 abuts against the top plate 33 for the purpose of loosening the mold in the cover 14 after the article has been pressed and vulcanized therein. An eye 45 is screwed into the top of cylinder 40 to receive the hook of a hoisting tackle for lifting off the cover 14.

The operation is as follows: The cover being hoisted up out of the way and the cylinder 24 discharged so that the ram 28 and platen 30 are in their lowest position, the mandrel 31 is placed upon the platen and the sheets or plates of unvulcanized rubber compound are assembled upon the four sides and top of the mandrel together with the four side plates 32 and the top plate 33 of the outer mold. The bell-shaped cover 14 is then lowered into position upon the base 13 and interlocked therewith by turning it until its lugs 23 come under the lugs 22 on the base. The waste pipe 42 of cylinder 40 is left open so that piston 43 may be pushed up by the rising mold. Pressure is then turned into the cylinder 24 so that the platen 30 with the mold thereon is elevated. The wedging reaction of the side plates 32 against the conical wall of cover 14 forces said plates horizontally along the platen 30 toward the mandrel 31, and the downward wedging action of the side plates upon the top plate 33 also forces the latter toward the mandrel, the result being that a heavy molding pressure is exerted between the movable plates and the mandrel, causing the edges of the battery jar to be firmly united and its sides and bottom walls to be fully compacted and molded. Steam is turned into the interior of the vulcanizing chamber 15 through the pipe 17 and, circulating around the mold, thoroughly heats and vulcanizes the article therein. The conical joint-forming surfaces 19, 20 and the packing ring 21 act as previously described to permit the slight upward lost-motion of the cover without causing leakage. When vulcanization is complete, pipe 17 is closed and the vulcanizing chamber is discharged through pipe 18. The pressure is also relieved in cylinder 24 and pressure is established in cylinder 40 so as to start the wedge-shaped mold out of the cone 14 and permit said mold to descend by gravity with the platen 30. Cover 14 may then be unlocked and lifted up out of the way to permit access to the mold, which latter is then opened, the molded battery jar removed, and said jar taken off from its mandrel in the usual manner. By supporting the mold on the platen wholly free from the cover when the platen is depressed, the parts of said mold may readily be assembled against the raw jar and stripped from the vulcanized jar.

I claim:

1. In a press, a stationary base and a cover having means for detachably connecting them against axial separation and forming a closed chamber, said cover having mold-contracting lateral wedging means, a longitudinally-acting power device on the base operating within said chamber, and a sectional mold adapted to be forced against the wedging means by said power device.

2. In a press, a stationary base having a power cylinder, a piston in said cylinder carrying a platen, a core and a laterally-contractible sectional outer mold carried by the platen, and a cover detachably connected with the base and forming a closed chamber therewith, said cover having side-wedging means adapted to contract the mold when the latter is forced into said cover by the movement of the platen.

3. In a press, a platen having a power device for moving it, a laterally-contractible sectional mold supported by said platen, and a hollow wedging cone rotatably mounted with reference to said mold and platen and adapted to contract the mold when the latter is moved by the platen toward the small end of the cone.

4. In a press, a base and a cover together forming a closed chamber and having coupling means at their meeting edges interlocked by relative rotary movement of the two, said cover having laterally-acting mold-contracting wedging means, a laterally-contractible sectional mold within said chamber, and means for forcing said mold longitudinally into said cover.

5. In a press, a stationary base, a cover forming therewith a closed chamber and having means for interlocking with the base by partial rotation of the cover, said cover having an internal hollow conical wedging surface, a power cylinder and piston mounted on said base, a platen actuated by said piston, and a laterally-contractible sectional mold supported by said platen free of the wedging surface when the platen is depressed, and adapted to be elevated thereby into wedging engagement with said surface.

6. In a vulcanizing press, a closed vulcanizing chamber composed of separable parts having means for detachably connecting them against axial separation, means for supplying a heating fluid to the interior of said chamber, laterally-acting mold-contracting wedging means and a laterally-contractible sectional mold within said chamber, and means movable independently of the chamber forming parts for forcing said mold longitudinally into engagement with said wedging means.

7. In a vulcanizing press, a shallow base, a deep cover forming therewith a vulcanizing chamber and having an internal conical wedging surface, means for supplying a heating fluid to the interior of said chamber, a power cylinder, piston and platen mounted on said base, and a sectional mold carried by the platen and adapted to be laterally contracted by said wedging surface when forced upwardly into the cover by the elevation of the platen.

8. In a press, a hollow wedging member and a platen mounted for relative longitudinal movement, a core and a sectional mold carried by the platen free of said wedging member when the platen is relatively retracted and adapted to be moved into wedging engagement therewith by the relative projecting movement of the platen, said mold being composed of side plates and an end plate wedged against the core by the contraction of the side plates thereon.

9. In a press, an inclosing wedge structure, a platen movable axially of said wedge structure, a laterally-contractible mold adapted to be moved by the platen into wedging engagement with said structure, and a power device for freeing the mold from said structure without opening the mold.

10. In a vulcanizing press, a base and a wedge-formed cover forming a vulcanizing chamber, a fluid-pressure cylinder on the base having an upwardly-acting piston which carries a platen, a mold on said platen adapted to be laterally contracted by wedging reaction with the cover when elevated by said platen, and supported wholly free from said cover when the platen and mold are depressed, and a fluid-pressure cylinder at the top of the cover having a downwardly-acting piston for loosening the mold in said cover.

In testimony whereof I have hereunto set my hand this 16th day of April, 1917.

JOHN R. GAMMETER.